United States Patent [19]

Feigler

[11] Patent Number: 5,772,519
[45] Date of Patent: Jun. 30, 1998

[54] TORSION DAMPER, HAVING A FRICTION DEVICE ESPECIALLY FOR A MOTOR VEHICLE

[75] Inventor: Jacques Feigler, St. Brice S/Foret, France

[73] Assignee: Valeo, Paris, France

[21] Appl. No.: 642,938

[22] Filed: May 6, 1996

[30] Foreign Application Priority Data

May 4, 1995 [FR] France .................................. 95 05332

[51] Int. Cl.[6] ...................................................... F16D 3/66
[52] U.S. Cl. ........................ 464/68; 192/213.22; 464/24
[58] Field of Search ................................ 464/24, 64, 66, 464/68, 67; 192/210.1, 213.22, 213.12, 214.1, 214.31; 74/574

[56] References Cited

U.S. PATENT DOCUMENTS

| | | | |
|---|---|---|---|
| 4,857,032 | 8/1989 | Aiki et al. ........................ | 192/214.1 X |
| 5,030,166 | 7/1991 | Worner et al. ........................ | 464/68 X |
| 5,042,632 | 8/1991 | Jackel ............................. | 192/213.22 X |
| 5,073,143 | 12/1991 | Friedman et al. ..................... | 464/64 X |
| 5,083,981 | 1/1992 | Forster ........................................ | 464/68 |
| 5,146,811 | 9/1992 | Jackel ........................................ | 464/64 |

FOREIGN PATENT DOCUMENTS

| | | |
|---|---|---|
| 2365728 | 4/1978 | France . |
| 2593871 | 8/1987 | France . |
| 2698939 | 6/1994 | France . |
| 3931429 | 4/1990 | Germany . |
| 4341371 | 6/1994 | Germany . |
| 0579430 | 8/1946 | United Kingdom . |
| 0938183 | 10/1963 | United Kingdom . |
| 2231123 | 11/1990 | United Kingdom . |

Primary Examiner—Eileen A. Dunn
Attorney, Agent, or Firm—Longacre & White

[57] ABSTRACT

A torsion damper comprising two coaxial parts which are mounted for rotation of one with respect to the other, with, interposed between these coaxial parts, apart from a centring element, circumferentially acting springs which are lodged in a cavity closed by the centring element, and friction device arranged outside the cavity. The friction device comprise, firstly, a cassette carried by one of the two coaxial parts, and secondly, a drive ring carried by the other coaxial part. The cassette includes at least two friction discs arranged to be coupled in rotation variously to the two coaxial parts of the damper, together with an axially acting resilient ring for holding the friction discs axially together.

8 Claims, 3 Drawing Sheets

TORSION DAMPER, HAVING A FRICTION DEVICE ESPECIALLY FOR A MOTOR VEHICLE

FIELD OF THE INVENTION

This invention relates in general terms to torsion dampers, especially for motor vehicles. More particularly, it relates to torsion dampers of the kind comprising two coaxial parts, namely a primary part and a secondary part, which are mounted for rotation of one with respect to the other, with, interposed operatively between the said coaxial rotatable parts, apart from a centring means, circumferentially acting resilient means and friction means.

BACKGROUND OF THE INVENTION

Such an arrangement is for example that which is used in the construction of a double damped flywheel. As is well known, a double damped flywheel comprises a primary flywheel and a secondary flywheel, between which a torsion damper is operatively interposed so as to couple the flywheels kinematically together. The torsion damper, being of the general type defined above, enables torsional vibrations from the engine of the vehicle to be absorbed.

The invention is directed more particularly to the case in which, in particular for the purpose of ensuring proper lubrication of the circumferentially acting resilient means, which typically consist of a set of coil springs, thus limiting any parasitic friction of which these springs can be the cause, the springs are mounted in a cavity which is arranged to contain a certain amount of grease packed around the springs. In practice this cavity is essentially defined in the primary rotating part of the flywheel, and the cavity is usually closed by the centring means. This is the case for example in German patent specification DE 39 31 429 A. In that document, the friction means are also housed within the grease cavity. As a result, the friction means can be affected by the grease in the cavity, which is of course detrimental to their frictional operation. A further undesirable result is that wear residue from the friction means inevitably pollutes the grease, so that the performance of the grease deteriorates.

In French patent specification FR 2 698 939 A, a torsion damper of the general kind discussed above is proposed, in which the circumferentially acting resilient means are lodged within a cavity which is closed by the centring means, and the friction means are located physically outside that cavity and are in engagement with the centring means. Thus the friction means are no longer exposed to the grease present in the cavity, and the latter is spared from contamination by the residues of wear in the friction means. In addition, access to the friction means is particularly easy, which facilitates the exchange of the latter during any reconditioning operation.

DISCUSSION OF THE INVENTION

An object of the present invention is to propose a torsion damper of this type, in which it becomes even easier to change the friction means if necessary. This is of particular advantage when the vehicle is a heavy goods vehicle.

According to the invention, a torsion damper, especially for a motor vehicle, of the kind comprising two coaxial parts, namely a primary part and a secondary part, which are mounted for rotation of one with respect to the other with, interposed operatively between the said parts, apart from centring means, circumferentially acting resilient means and friction means, the resilient means being lodged in a cavity which is closed by the centring means, the friction means being disposed outside the said cavity and in engagement with the centring means, is characterised by the fact that the friction means comprise, firstly, a cassette carried by one of the two said coaxial parts and, secondly, a drive ring carried by the other one of the two coaxial parts, the cassette comprising at least two friction discs, which are able to be coupled in rotation variously with the two coaxial parts, with an axially acting resilient means for holding the said at least two friction discs axially together.

The cassette preferably comprises two stirrup members fastened together. Preferably, each stirrup member is generally annular and dish-shaped, with a flat flange and a base portion which is also flat, the planes of the flange and base portion being offset axially from each other.

According to a preferred feature of the invention, each stirrup member has two apertures formed by stamping, the portion displaced by said stamping being bent over so as to constitute a lug.

Each stirrup member preferably has two apertures which are adapted to receive the said lugs at least partially when the two stirrup members are assembled together with their flanges in abutment with each other.

According to another preferred feature of the invention, at least one of the friction discs has slots with which the said lugs cooperate.

The axially acting resilient means is preferably a Belleville ring having at its periphery slots with which the lugs cooperate.

Preferably, the centring means consist of a rolling bearing, with each stirrup member having bosses for retaining one of the rings of the rolling bearing axially.

According to a further preferred feature of the invention, the drive ring is an annular ring having drive lugs for driving in rotation at least one of the friction discs that is not driven by the cassette.

The centring means preferably consist of a rolling bearing, with the drive ring having locating portions for axial location of one of the rings of the rolling bearing.

In a preferred embodiment of the invention, the cassette is fixed to the secondary part of the torsion damper, while the drive ring is fixed to its primary part.

The various features and advantages of the invention will appear more clearly on a reading of the following description of some preferred embodiments of the invention, which is given by way of non-limiting example only and with reference to the accompanying diagrammatic drawings.

DESCRIPTION OF PREFERRED EMBODIMENTS OF THE INVENTION

Figure 1:
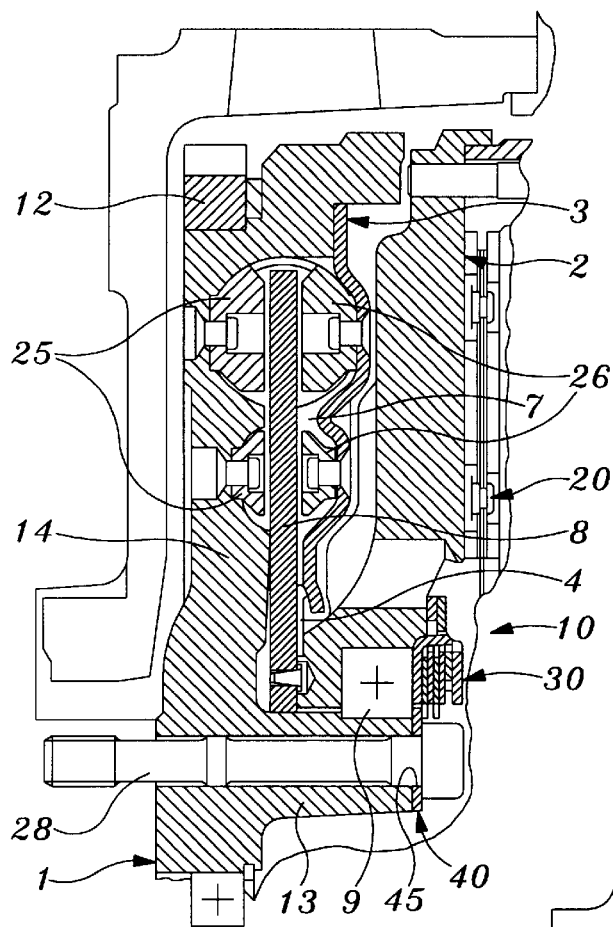
FIG. 1 is a view in axial cross section showing part of a torsion damper in accordance with the invention.

In the drawings, the primary flywheel 1 of the torsion damper is arranged to be mounted on a driving shaft for rotation with the latter. In this example the driving shaft is the crankshaft of the engine of the vehicle. The primary flywheel 1 is typically secured to the crankshaft by means of studs, such as those indicated at 28.

The primary flywheel 1 consists of a primary plate 14 which carries the starter crown 1 2 on its periphery, and which has a central hub 1 3 integral with the primary plate 14. On the side of the hub 1 3, the primary plate 14 is so arranged that, together with an annular shroud piece 3, it defines a sealed chamber 7. Springs 5, acting circumferentially, are mounted within this chamber 7. The springs 5, which in this example are of the helical type, are received in annular recesses 15 formed in the primary plate 14, and in recesses defined by press-formed portions 16, which are again annular, in the shroud piece 3. Blocks or thrust pieces 25, for endwise circumferential engagement by the ends of the springs 5, are located and fixed in the annular recesses 15 in the primary plate 14; and similar blocks or thrust pieces 26 are located and fixed in the annular recesses 16 of the shroud piece 3.

A damper plate 8 is disposed axially between the blocks 25 and 26, and is formed with arms 18 which extend radially across the chamber 7 so as to act on the springs 5. The damper plate 8 is secured by means of screws to a secondary flywheel 2. The secondary flywheel 2 is mounted coaxially on the primary flywheel 1 through interposed centring means 9, which here take the form of a ball bearing. The bearing 9 is located between the outer periphery of the hub 13 of the primary flywheel 1 and the inner periphery of the secondary flywheel 2.

A resilient seal 4 in the form of a disc, carried by the damper plate 8 of the secondary flywheel 2 and in engagement on the shroud piece 3, seals the chamber 7 on the side of the latter nearest to the axis of the assembly, in conjunction with a static seal 24 which is located between the primary plate 14 and the outer peripheral edge of the shroud piece 3.

The secondary flywheel 2 constitutes the reaction plate of a clutch, and offers a friction face to the clutch friction wheel 20 of the clutch. The mechanism of the clutch itself, comprising its cover plate, pressure plate and resilient thrust means, such as a diaphragm, are not shown in the drawings. The clutch couples the secondary flywheel 2 disengageably in rotation to a driven shaft which in this example is the input shaft of the gearbox. This driven shaft is fixed with respect to the clutch friction wheel 20, so as to rotate with it. When the clutch is engaged, the friction liners of the friction wheel 20 are gripped between the pressure plate (not shown) and the reaction plate comprised in the secondary flywheel 2.

A torsion damper is interposed between the primary flywheel 1 and the secondary flywheel 2. The torsion damper has circumferentially acting resilient means which in this example consist of the springs 5, together with friction means 10 which will now be described.

The friction means 10 comprise a cassette 30 which is fixed to the secondary flywheel 2, together with a drive ring 40 formed with lugs, the drive ring 40 being fixed to the primary flywheel 1. The friction means 10 are arranged on the outer face of the secondary flywheel 2, on the opposite side of the latter from the plate 14, and more precisely in a frontal groove 11 which is arranged, in the manner known per se, for the collection of oil.

The cassette 30 comprises two annular stirrup members 31, which in this example are identical to each other, and which are fastened together by means of rivets 19. Each stirrup member 31 has the general form of a dish, with a flat flange 34 and a base portion 35 which is also flat, the planes of the flange 34 and base portion 35 being offset axially from each other. Each stirrup 31 is press-formed from a sheet metal blank, in which two diametrically opposed apertures 36 (FIG. 6) are formed by stamping out, the metal displaced in this operation being turned so as to constitute a lug 37 of each stirrup member 31. Each lug 37 extends at right angles to the plane of the base portion 35 of the respective stirrup member.

Figure 5:
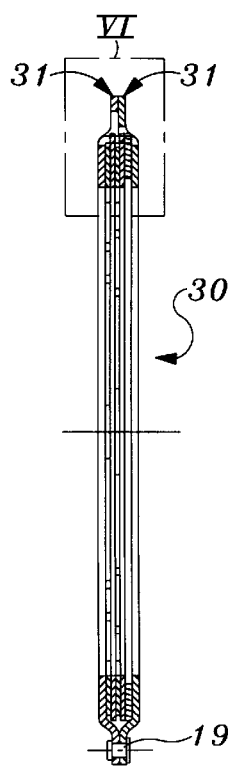
FIG. 5 is a cross section taken on the line V—V in FIG. 4.
Figure 8:
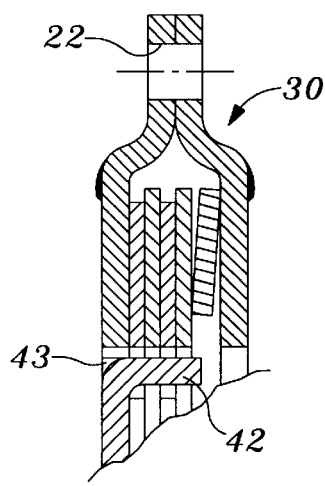
FIG. 8 is a view similar to FIG. 6, but the cross section here is taken on a different plane.
Figure 7:
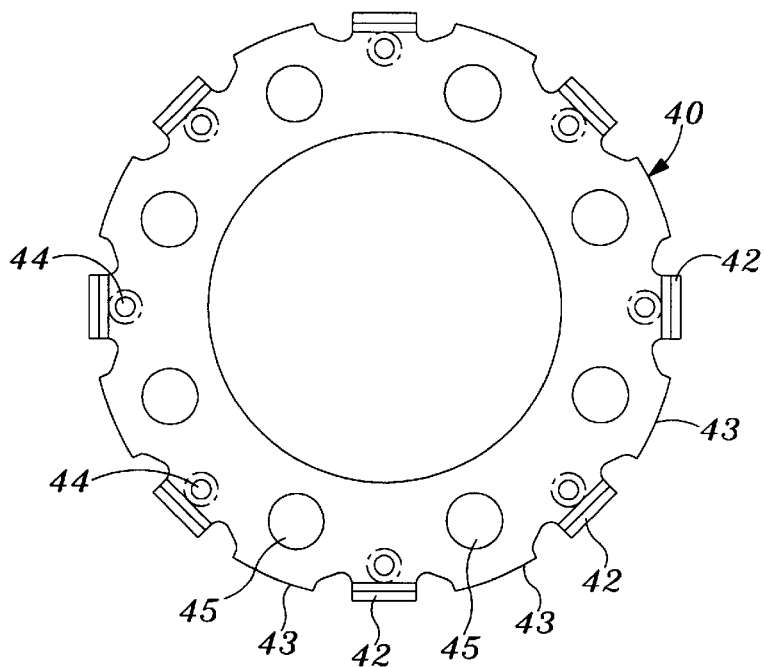
FIG. 7 is a front view of the drive ring.
Figure 6:
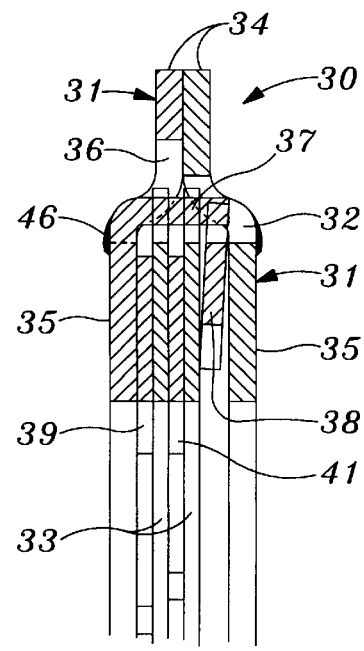
FIG. 6 is a view on a larger scale of the detail indicated at VI in FIG. 5.

On a diameter which is at right angles to the diameter passing through the lugs 37, two apertures 32 are provided. Each of these apertures is arranged to receive at least part of the corresponding lugs 37 when the two stirrup members 31 are assembled together with their flanges 34 abutted against each other. The cassette is shown in FIGS. 5 and 6. An annular housing is thus formed, which is adapted to receive at least one friction disc 33 and at least one further friction disc.

In the example shown, there are two of the friction discs 33, and two of the said further friction discs, namely a disc 39 and a disc 41. The discs 33 are fixed to the stirrup members 31 for rotation with the latter, while the discs 39 and 41 are arranged to be driven in rotation by the drive ring 40. Also contained in the above mentioned annular housing is an axially acting resilient means, in this example a Belleville ring 38, which holds the various friction discs 33, 39 and 41 together. More precisely, the friction discs 33 have at their outer periphery a set of radial slots with which the lugs 37 of the stirrup members 31 cooperate so as to drive the discs 33. The same is the case for the Belleville ring 38.

The friction discs 39 and 41 have at their inner periphery slots which are again radial, and of which there are eight in the example shown. The disc 39, which lies between the base portion 35 of one stirrup member 31 and one of the friction discs 33, is formed with slots 29. The friction disc 41, which lies between the two friction discs 33, has slots 21. The slots 21 of the disc 41 have a greater circumferential width than the slots 29 of the disc 39.

The drive ring 40 is, in general terms, an annular ring in the form of a flat metal pressing. Eight drive lugs 42 of the drive ring 40 have been turned back axially so as to drive the friction discs 39 and 41 in rotation by cooperation of these lugs 42 with the slots 29 and 21 of the friction discs. The circumferential width of each lug 42 is equal, subject to fitting clearances, to the circumferential width of the corresponding slot 29 in the friction disc 39, so that the disc 39 is coupled to the drive ring 40 for rotation together without any circumferential play. By contrast, and having regard to the fact that the width of each slot 21 is greater than that of the corresponding lug 42 of the drive ring 40, the latter will only drive the friction disc 41 after a circumferential clearance has been taken up, this clearance corresponding to the difference in the widths of the slots 21 and 29. Thus the friction device 30, 40 works in two-stage operation.

Between the drive lugs 42 at the outer periphery of the drive ring 40, the latter has semicircular portions 43, which are referred to as locating portions. When the drive ring 40 is fixed on the frontal face of the hub 13, by means of screws 27 which pass through fastening holes 44 in the drive ring 40, the locating portions 43 lie in line with the inner ring of the ball bearing 9, thus maintaining the latter axially in position.

Passages 45 in the drive ring 40 enable the fastening studs 28 for the primary flywheel 1 to extend through the drive ring, so that the latter thus advantageously replaces the multiple washers which are conventionally placed under the heads of such studs. It is also possible of course, in a modified version not shown, to make the drive ring 40 independent of the fastening studs 28, with the latter not passing through the drive ring.

Figure 2:
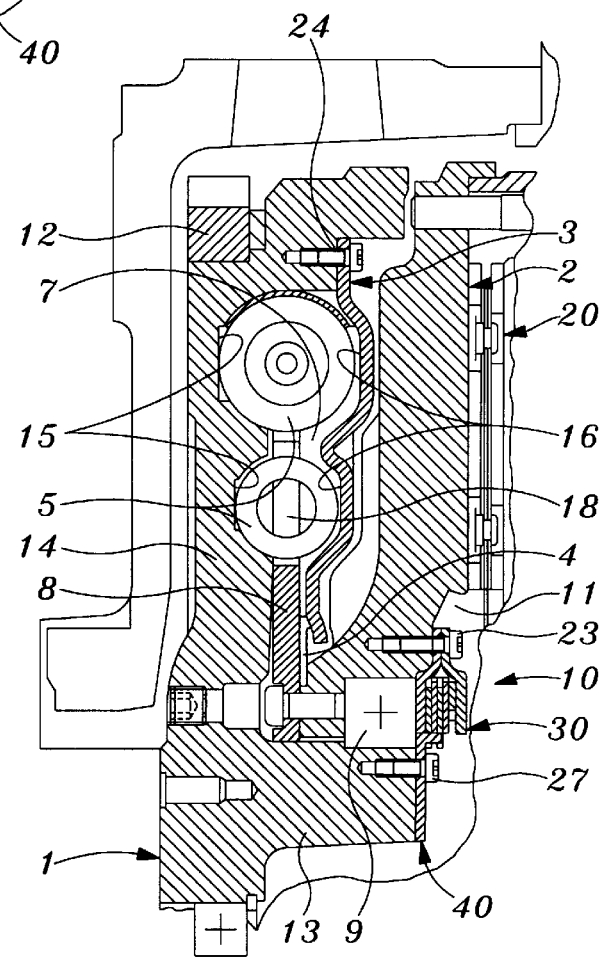
FIG. 2 is a view in axial cross section showing part of the same torsion damper, the cross section being taken on a different plane from that in FIG. 1.

Because of the fastening holes 22 arranged in the flanges 34 of the stirrup members 31, the cassette 30 is secured, by means of screws 23, to the secondary flywheel 2 as can be seen in FIGS. 1 and 2. It will be appreciated that, when fitted in position, the cassette constitutes a grease-retaining end closure for the ball bearing 9. In addition, the stirrup member 31 is formed with semicircular abutment bosses 46, of which there are eight in the example shown, for retaining the outer ring of the ball bearing 9 axially in position.

Figure 3:
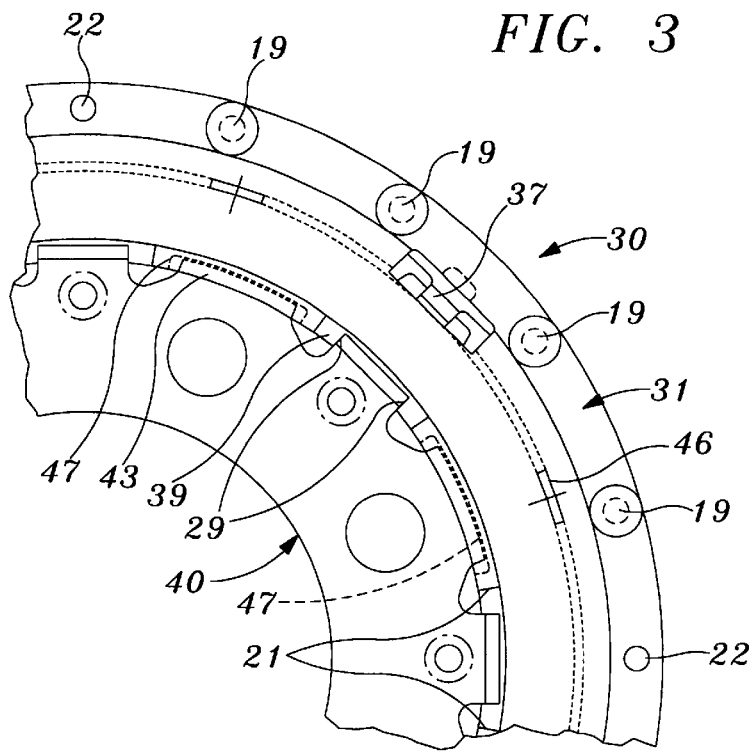
FIG. 3 repeats on a larger scale the detail indicated at III in FIG. 4, with the drive ring having been added.
Figure 4:
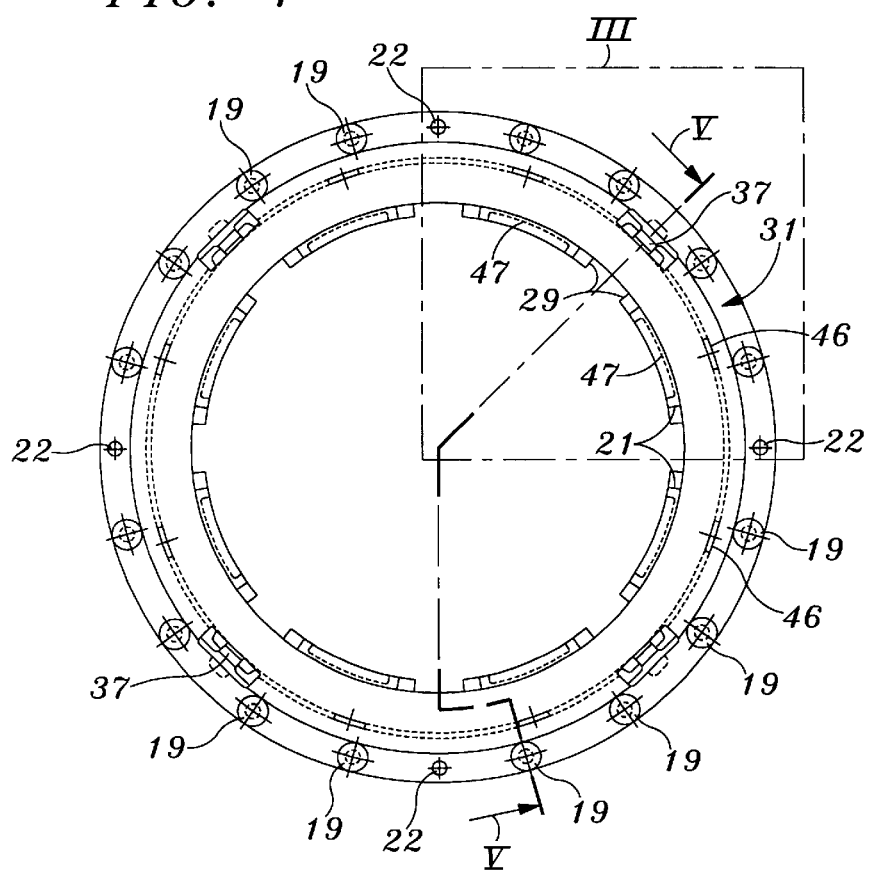
FIG. 4 is an end view of the cassette in accordance with the invention, shown by itself.

In order to avoid any possible interference between the friction disc 39 closest to the ball bearing 9 and the ring 40, in particular the locating portions 43 of the drive ring 40, it is preferable to provide rebates 47 in the disc 39, in line with the locating portions 43, as is best seen in FIG. 3.

As can be seen, the cassette 30 is very easy to change, because all that is necessary is to remove the four fastening screws 23. In addition, the cassette 30, comprising its friction discs and its Belleville ring, is assembled as a unit by means of its rivets 19. It is thus easy to set the discs beforehand in the factory so as to give the required friction effects, before the unit is fitted on the vehicle. This enables a major time-saving to be achieved, especially in terms of fitting an exchange unit, which is important as regards making maximum use of a vehicle. It will be understood that it is also easy to dismantle the various members of which the clutch is composed, such as the double flywheel and the damper plate secured by screws.

Figure 9:
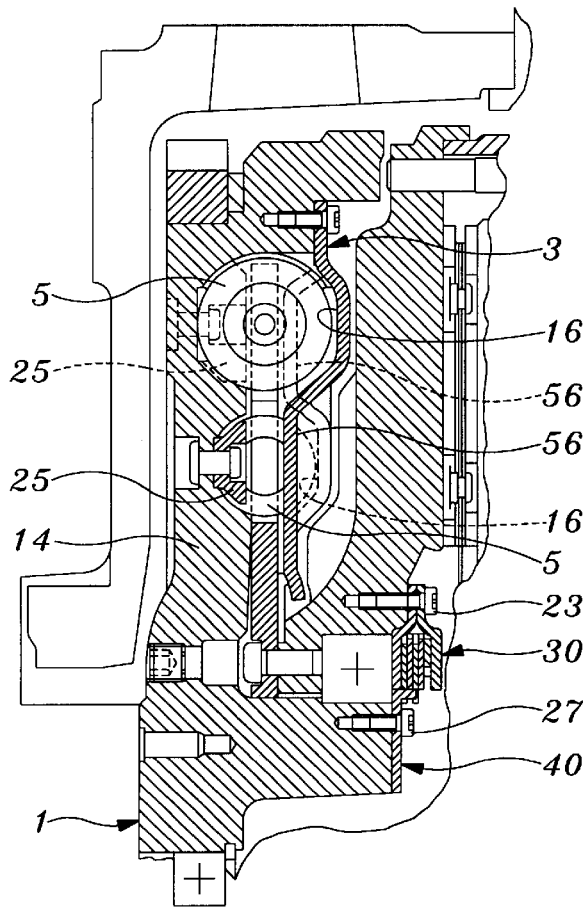
FIG. 9 is similar to FIG. 1 but shows another embodiment of a torsion damper in accordance with the invention.

In the modified embodiment shown in FIG. 9, the circumferential abutments for the springs 5 consist firstly of blocks 25 fixed to the primary plate 14 as in the previous embodiment and, secondly, edges 56 between the annular recesses 16 of the shroud piece 3, in place of the blocks 26 fixed on the shroud piece 3.

What is claimed is:

1. A torsion damper comprising: a primary rotatable part; a secondary rotatable part; centring means interposed operatively between the primary and secondary parts and mounting the secondary rotatable part coaxially on the primary rotatable part for relative rotation between the coaxial rotatable parts; circumferentially acting resilient means interposed between the rotatable parts; and friction means operatively interposed between the rotatable parts, the torsion damper defining a cavity containing the resilient means, the centring means closing the cavity, and the friction means being disposed outside the cavity in engagement with the centring means, wherein the friction means comprise a cassette fixed to the secondary rotatable part and a drive ring fixed to the primary rotatable part, the cassette comprising: two annular stirrup members which define an annular housing and means fastening the stirrup members together, and wherein the cassette further comprises axially acting resilient means, a first friction disc and a second friction disc received in said annular housing, said first friction disc being arranged to be driven in rotation by the drive ring, said second friction disc being fixed to the stirrup members for rotation with said stirrup members, said axially acting resilient means pressing the first friction disc in contact with the second friction disc.

2. A torsion damper according to claim 1, wherein each said stirrup member is annular and generally dish-shaped, defining a flat flange and a flat base portion, the flange and base portion defining respective planes offset axially from each other.

3. A torsion damper according to claim 1, wherein the centring means comprise a rolling bearing, the drive ring having locating portions axially locating one of the rings of the rolling bearing.

4. A torsion damper according to claim 1, wherein each said stirrup member has two apertures and a portion adjacent to each said aperture bent back so as to constitute a lug.

5. A torsion damper according to claim 4, wherein each stirrup member defines two further apertures, the stirrup members being assembled together with their flanges abutting said lugs being at least partially received in said further apertures.

6. A torsion damper according to claim 4, wherein at least one of the friction discs defines slots cooperating with said lugs.

7. A torsion damper according to claim 4, wherein the said axially acting resilient means is a Belleville ring having peripheral slots cooperating with said lugs.

8. A torsion damper according to claim 1, wherein the centring means consist of a rolling bearing, each said stirrup member defining bosses engaging one of the rings of the rolling bearing so as to retain the ring axially in position.

* * * * *